United States Patent
Thyzel (10) Patent No.: US 7,658,548 B2
(45) Date of Patent: Feb. 9, 2010

(54) COUPLING DEVICE FOR A LIGHT GUIDE

(75) Inventor: Reinhardt Thyzel, Heroldsberg (DE)

(73) Assignee: A.R.C. Laser GmbH, Nuremberg (DE)

( * ) Notice: Subject to any disclaimer, the term of this patent is extended or adjusted under 35 U.S.C. 154(b) by 0 days.

(21) Appl. No.: 12/260,755

(22) Filed: Oct. 29, 2008

(65) Prior Publication Data
US 2009/0116791 A1    May 7, 2009

Related U.S. Application Data (63) Continuation-in-part of application No. 11/569,652, filed as application No. PCT/EP2005/011291 on Oct. 20, 2005, now abandoned.

(30) Foreign Application Priority Data

Dec. 15, 2004  (DE) ................ 10 2004 060 761

(51) Int. Cl.
    *G02B 6/38* (2006.01)
(52) U.S. Cl. ............... 385/56; 385/66; 385/68; 385/70; 385/88
(58) Field of Classification Search ............ 385/56, 385/66, 68, 70, 88
    See application file for complete search history.

(56) References Cited

U.S. PATENT DOCUMENTS

| | | |
|---|---|---|
| 4,487,474 A | 12/1984 | Nishie et al. |
| 5,239,602 A | 8/1993 | Hunsberger et al. |
| 5,537,501 A | 7/1996 | Iwano et al. |
| 5,594,819 A * | 1/1997 | Narendran et al. ............ 385/12 |
| 5,615,291 A | 3/1997 | Hayakawa et al. |
| 5,843,073 A | 12/1998 | Sinofsky |
| 6,358,874 B1 | 3/2002 | Kobayashi et al. |
| 6,761,490 B2 | 7/2004 | Wada et al. |
| 2002/0146214 A1 | 10/2002 | Tanaka et al. |

FOREIGN PATENT DOCUMENTS

| | | |
|---|---|---|
| DE | 9013951 U1 | 3/1991 |
| DE | 4216254 C2 | 11/1993 |
| DE | 19807055 A1 | 9/1998 |

(Continued)

OTHER PUBLICATIONS

Office Action mailed Apr. 29, 2008, U.S. Appl. No. 11/569,652.

*Primary Examiner*—Hemang Sanghavi
(74) *Attorney, Agent, or Firm*—Workman Nydegger (57) ABSTRACT

A coupling device includes a first coupling element having a first passage, and an end section connected to the free end of the light guide; as well as a second coupling element with a second passage for holding/fixing an intermediate section following the end section of the light guide. In one implementation, the first coupling element and the second coupling element can be detachably joined in a coupled state, where the first passage and the second passage form a common passage and/or have (or surround) a common longitudinal axis. The first passage can be configured with a funnel-shaped section that, in the coupled state, the first passage faces the second passage and widens toward the second passage. In addition, the first coupling element may be formed from ceramic material at least on its inner surface in the region of the funnel-shaped section.

25 Claims, 5 Drawing Sheets

FOREIGN PATENT DOCUMENTS

| | | |
|---|---|---|
| DE | 19734922 A1 | 2/1999 |
| DE | 69033767 T2 | 4/2002 |
| EP | 0898186 A1 | 2/1999 |
| GB | 2322327 A | 8/1998 |
| JP | 06027348 A | 2/1994 |

* cited by examiner

COUPLING DEVICE FOR A LIGHT GUIDE

This application is a continuation-in-part of U.S. National Stage patent application Ser. No. 11/569,652, filed on Nov. 27, 2006, entitled "COUPLING DEVICE FOR A LIGHT GUIDE," which corresponds to PCT/EP05/11291 (Publication No. WO 200606647), filed on Oct. 20, 2005, entitled "COUPLING DEVICE FOR AN OPTICAL WAVE GUIDE," and which claims the benefit of priority to German Patent Application No. 102004060761.3, filed on Dec. 15, 2004, entitled "COUPLING DEVICE FOR AN OPTICAL WAVE GUIDE." The entire content of each of the aforementioned patent applications is incorporated herein by reference.

BACKGROUND OF THE INVENTION

1. The Field of the Invention

The invention relates to a coupling device for connecting a light guide.

2. Background and Relevant Art

Optical coupling devices, in particular plug-in connections or screw connections, are known for optically connecting a light guide, for example an optical fiber, to other optical components or further light guides. In order to ensure a reliable transmission of the light, the light guide and the further optical component or the two light guides must be joined to one another or aligned with one another with particular accuracy with reference to the light propagation direction or the optical axes in the coupling device so that the light or the light signal is transmitted as completely as possible. Moreover, especially at their particularly sensitive ends, the sensitive optical fibers must be protected against mechanical damage.

One possible application of light guides is for transmitting light, in particular laser light, for processing materials or for the medical treatment of humans or animals, in particular in opthalmology, for example in the explantation of the natural eye lens during cataract operations in the course of the phacoemulsification during which shock waves produced by means of laser light emulsify the lens and are exhausted (photolysis), or in operations on the cornea, for example for treating myopia.

Another application is the transmission of information relating to light signals through light guides in metrology, communications technology and data systems technology.

EP 0 898 186 A1 discloses a plug-in connection for centered connection of a light guiding fiber, or for centered coupling of two light guiding fibers, that has a plug and a socket with a cutout in which the plug engages. The light guiding fiber is led through the socket and ends with a fiber end in a bore in the plug that expands in a funnel-shape fashion in the direction of the socket. In order to protect it against mechanical damage, the optical fiber is rigidly held in a tube that surrounds the fiber inside the bore of the plug up to the fiber end. The socket and the plug with the funnel-shaped section of this known plug-in connection are produced from plastic, preferably as injection-molded parts.

In a further plug-in connection, which is known in practice and constructed in a fashion similar to the embodiment in accordance with EP 0 898 186 A1, the optical fiber is not surrounded by a tube, but its end projects freely into the funnel-shaped section of the plug. The plug with the funnel-shaped inner surface is manufactured from metal, specifically high grade steel, by turning, and is mostly also redressed. When the plug and socket are plugged together, the funnel serves as a guiding and centering aid for the light guide.

BRIEF SUMMARY OF THE INVENTION

It is an object of the invention to provide a novel optical coupling device for light guides.

This object is achieved by means of the subject matter in accordance with the independent claims herein. Advantageous refinements and developments in accordance with the invention follow from the dependent claims herein.

The coupling device (optical coupler) for connecting a light guide to at least one further light guide and/or to at least one optical component comprises a first coupling element with a first passage for holding an end region of the light guide, and a second coupling element with a second passage for holding a section of the light guide, the first coupling element and the second coupling element being capable of being detachably joined, or being detachably joined in a coupled state, and the first passage and the second passage forming a common passage in the coupled or joined state (or: facing one another with their outlet regions, or merge into one another) and/or have or surround a common longitudinal axis. The first passage of the first coupling element has a funnel-shaped section (or: funnel-shaped inlet region, inlet funnel) that widens toward the second coupling element in the coupled state. At least in the region of the funnel-shaped section, the first coupling element is then produced, at least on the inner surface thereof, from ceramic material (or: ceramic).

The invention proceeds from the surprising observation that despite the flexibility of the fiber and the funnel shape of the bore in the plug, in some practical cases the sensitive end of the optical fiber suffers damage when this fiber end slides along the funnel surface. Investigations thereupon set up by the inventor revealed that the funnel of the plug in the known coupling devices nevertheless has surface roughnesses and unevennesses on the inner side that are comparatively large by comparison with the fiber cross section, and this being so despite the processing of the surfaces. The turning produces furrows in the funnel made from high grade steel, and even the plastic injection-molded part also has a relatively high surface roughness owing to its material properties. The furrows and the rough surface in the funnel can cause the optical glass fibers to splinter and/or break off and/or be damaged at their ends. The optical fibers are thereby rendered useless.

In order to solve or allay this problem, it is provided in accordance with the invention that, at least in the region of the funnel-shaped section of the first passage, the first coupling element consists of a ceramic material at least on the inner surface.

Even without subsequent treatment by polishing or similar measures, parts or layers made from a ceramic material can be produced with a particularly smooth surface. When the end region of the light guide strikes the inner surface of the funnel, the light guide can slide along this inner surface without becoming stuck at a depression or elevation on the surface. Consequently, the risk of the light guide being damaged during joining of the coupling elements is substantially diminished. The funnel-shaped section of the first passage can now be used or provided without any problem for positioning or guiding, in particular centering, the light guide end during insertion (or: threading) into the first passage of the first coupling element, and the insertion of the light guide is generally made easier.

In a particularly advantageous embodiment, the first passage of the first coupling element has a second section that adjoins the funnel-shaped section and is arranged in the coupled state on the side of the funnel-shaped section that is averted from the second passage, and preferably holds the free end and a directly adjacent first part of the end section of the light guide and adjusts it in such a way that an optical axis of the light guide is substantially aligned at the free end thereof along a longitudinal axis of this second section. The inside diameter of this second section of the first passage is expediently substantially constant and adapted to the outside diameter of the light guide, which is substantially constant at least in the end section, so that the light guide fits accurately or is seated in a form-fitting fashion.

The coupling device in accordance with the invention is provided in general for connecting the light guide to at least one further light guide and/or to at least one optical component, in particular a light-emitting component, for example a laser or a laser diode or an LED, or a light detecting component, in particular a photoelectric component such as a phototransistor or a photodiode, or a light applying instrument, for example a handheld instrument for applying the (laser) light, in which case the further light guide and/or the optical component can be, or are or is connected to or in the first passage of the first coupling element, in particular to or in the second section of the first passage on the side averted from the funnel-shaped section. In the connected state, the further light guide is preferably held with its free end and an adjoining end section in the second section of the first passage and is adjusted in such a way that an optical axis of the light guide is substantially aligned at the free end thereof along a longitudinal axis of this second section, and the free ends of the two light guides lie opposite one another. In order also to facilitate the insertion and centering of the further light guide, the first passage can then advantageously have a third section that expands in a funnel-shaped fashion away from the second section.

Furthermore, it is possible to provide at least one third coupling element for holding the further light guide and/or the at least one optical component, in which the third coupling element can be detachably joined or is detachably joined in a coupled state. This third coupling element now preferably has a third passage for holding and/or fixing an intermediate section, following the end section, of the further light guide. In particular, in the coupled state the first passage of the first coupling element and the third passage of the third coupling element also form a common passage and/or have or surround a longitudinal axis.

It is particularly advantageous when the common longitudinal axis of the first passage and second or third passage is a longitudinal central axis or a central longitudinal axis such that an axial arrangement of the light guide in the coupling device is then substantially enabled without bending the light guide.

The first coupling element can be constructed in one piece or one part, or else alternatively from two or more prefabricated parts that are fastened or connected on one another or to one another, at least one part with the funnel-shaped section of the first passage being produced or formed from the ceramic material at least on the inner surface thereof. The outlay on mounting is less in the case of a design in one part. By contrast, in the case of a multipartite design, the funnel-shaped section has the desired smooth surface, while the materials for the remaining parts of the first coupling element can be selected in targeted fashion in accordance with the requirements.

In a part of the first coupling element that has the first passage or at least the funnel-shaped section of the first passage, the first coupling element can be produced or formed completely or only partially from ceramic material, in particular the same ceramic material. In an advantageous embodiment, the entire first passage is formed or manufactured, at least on its inner surface, from ceramic material. This embodiment is particularly advantageous in combination with the embodiment in which the first passage has a further section, adjoining the funnel-shaped section, for holding the light guide end, and the light guide end therefore also possibly slides or drags on the inner surface of this further section upon being inserted.

In the event of the formation of the entire coupling element or its parts from solid ceramic material, it is preferred to apply a primary forming process that comprises the production steps typical of the production of a ceramic, in particular the shaping of a blank from the finely divided starting materials or raw materials, the ceramic baking or the sintering of the blank, generally previously dried, and subsequent treatment, if appropriate.

Coming chiefly into consideration as shaping processes are casting methods with a flowable starting composition, preferably injection molding, but also powder compression methods or powder pressure methods with the aid of pulverulent starting materials.

Alternatively, the first coupling element can also be formed entirely, or in said part with the first passage or its funnel-shaped section, from a basic body and a surface layer made from the ceramic material. The basic body can in this case consist of a metal, in particular aluminum or an aluminum alloy or a steel. In addition, an intermediate layer, in particular for promoting adhesion, and/or a chromium-nickel layer can be provided between the basic body and surface layer made from ceramic material. The ceramic surface layer can be applied by spraying, in particular thermal spraying or plasma spraying.

The ceramic material of the coupling device is expediently selected or optimized with regard to a good sliding behavior or a low slippage resistance or coefficient of kinetic friction of the light guide on the ceramic surface of the first passage, in particular in the funnel-shaped section.

In particular, it is ensured that the ceramic material has a sufficiently low surface roughness or a sufficiently smooth surface. The surface roughness, in particular the arithmetic mean Ra, is preferably selected to be small by comparison with the dimensions of the light guide cross section, which typically lie in the range from 100 µm to 1000 µm, preferably 200 µm to 800 µm, for example a factor of at least 50, preferably at least 100, smaller than the light guide diameter, and/or lies, in particular, below one, or at most at one of the following values: 3 µm, 2.5 µm, 2 µm, 1.5 µm, 1 µm, 0.5 µm.

Surface roughnesses of 1.5 µm to 3 µm can be achieved as "standard" surfaces of ceramic molded parts or ceramic layers that are a result of primary formation and have been produced by standard coating methods such as thermal spraying or plasma spraying, without further reworking or redressing. The surface can be additionally polished or finely reworked in some other way for lower surface roughnesses. It is possible thereby even to set surface roughnesses of 0.3 µm and below. By comparison therewith, in the prior art the steel surface has a roughness of at least 20 µm even in the case of fine surface machining.

The ceramic material preferably comprises (includes or consists of) at least one oxide ceramic material, in particular one or more from the group of oxide ceramic materials comprising aluminum oxide, titanium dioxide, chromium oxide, magnesium oxide, beryllium oxide and zirconium dioxide. Particularly suitable for ceramic layers, but not restricted thereto, is a ceramic having a mixture or a composition of two or more of said oxide ceramics, preferably of aluminum oxide and/or chromium oxide having a fraction of titanium dioxide for stabilization, preferably a composition having a fraction of aluminum oxide of between 60% and 97% (percentage by weight) and a fraction of titanium dioxide of between 3% and 40%, or a fraction of chromium oxide in a range from 40% to 60% and a fraction of titanium dioxide in a range from 40% to 60%.

However, it is also possible to use nonoxidic ceramics, in particular carbides, for example silicon carbide, or nitrides, or else silica-containing ceramics, in particular porcelain and/or with a glaze.

The second coupling element and/or third coupling element can be formed from plastic and/or be designed as an injection-molded part, but also from ceramic material, in particular with similar specifications as those described with the aid of the first coupling element.

In particular, the second coupling element is designed as a Luer push-on socket or a Luer push-on plug, and the first coupling element is designed as a Luer push on plug or a Luer push-on socket.

In an advantageous embodiment, the connection of first coupling element, on the one hand, and second or third coupling element, on the other hand, is a plug-in connection, but it can also be a screw connection.

Furthermore, according to the invention the use of the above-described coupling device inside an appliance of medical technology is provided, preferably for a surgical system. Numerous operations are carried out with the aid of laser light. Even locations in the body that are difficult to access can be treated in this case with laser light. Furthermore, the above coupling device can also be used for an endoscopic system. Moreover, the above coupling device can be used in a system that is provided for operations on the human or animal eye, in particular for operations on the lens, for example for treating the cataract or for operations on the cornea in order to correct ametropia.

In a particularly advantageous embodiment, the coupling device connects a laser to a handheld instrument. In particular, a laser system for laser light application on the human or animal body, in particular the eye, has a laser and a handheld instrument and at least one light guide, as well as at least one coupling device for the light guide in order to transmit the light of the laser to the handheld instrument.

In a further embodiment according to the invention a coupling device for a light guide comprises:
 a) a first coupling element with a first passage for holding or fixing the light guide, the light guide having an end section with a free end and an intermediate section, following the end section, wherein the end section with the free end and the intermediate section of the light guide each protrude from the first passage;
 b) a second coupling element with a second passage for holding the light guide in the intermediate section;
 c) wherein the first coupling element and the second coupling element are detachably joined in a coupled state;
 d) wherein the second passage comprises a funnel-shaped section and a subsequent central section;
 e) wherein the central section extends along a central axis and has a diameter which is only slightly larger than the outer diameter of the light guide so that the central section delimits movement of the light guide when inserted in radial direction orthogonal to the central axis but not in axial direction along the central axis;
 f) wherein the funnel-shaped section of the second passage decreases in diameter in the direction towards the central passage, in particular linearly or in a conical shape, and has an inner guiding surface guiding the end section or the free end of the light guide towards the entrance of the central section during insertion movement of the light guide into the second passage with a component parallel to the central axis towards the central section during a joining movement of the two coupling elements into their coupled state;
 g) wherein at least in the region of the funnel-shaped section, the first coupling element is formed or made from ceramic material at least on its inner guiding surface;
 h) in the coupled state of the two coupling elements, the first passage and the second passage form a common passage for the light guide and/or have or surround a common longitudinal axis, the intermediate section of the light guide is arranged within the central section of the second passage and the end section with the free end of the light guide protrudes from the central section of the second passage at the side facing away from the first passage of the first coupling element or from the funnel-shaped section by a minimum distance of at least 1 mm, in particular between 1 mm and 5 mm, preferably between 1 mm and 3 mm.

Especially when laser light is focused in a focal region at the free end of the light guide, which focal region is preferably adapted in its diameter to the diameter of the light guide at the free end, and fed into the light guide at its free end the distance of the free end of at least 1 mm consequently of the focal region of the laser light has shown to be sufficient to prevent the laser light damaging the surface at and around the central section and partial evaporation of material therefrom, which could deposit on the free end of the light guide and deteriorate its transmission characteristics during adjusting process or also in the adjusted position if laser light of high intensity is used.

BRIEF DESCRIPTION OF THE DRAWINGS

Preferred embodiments of the coupling device according to the invention are explained in more detail below with reference to the attached drawings, in which.

DETAILED DESCRIPTION OF THE PREFERRED EMBODIMENTS

Figure 1:
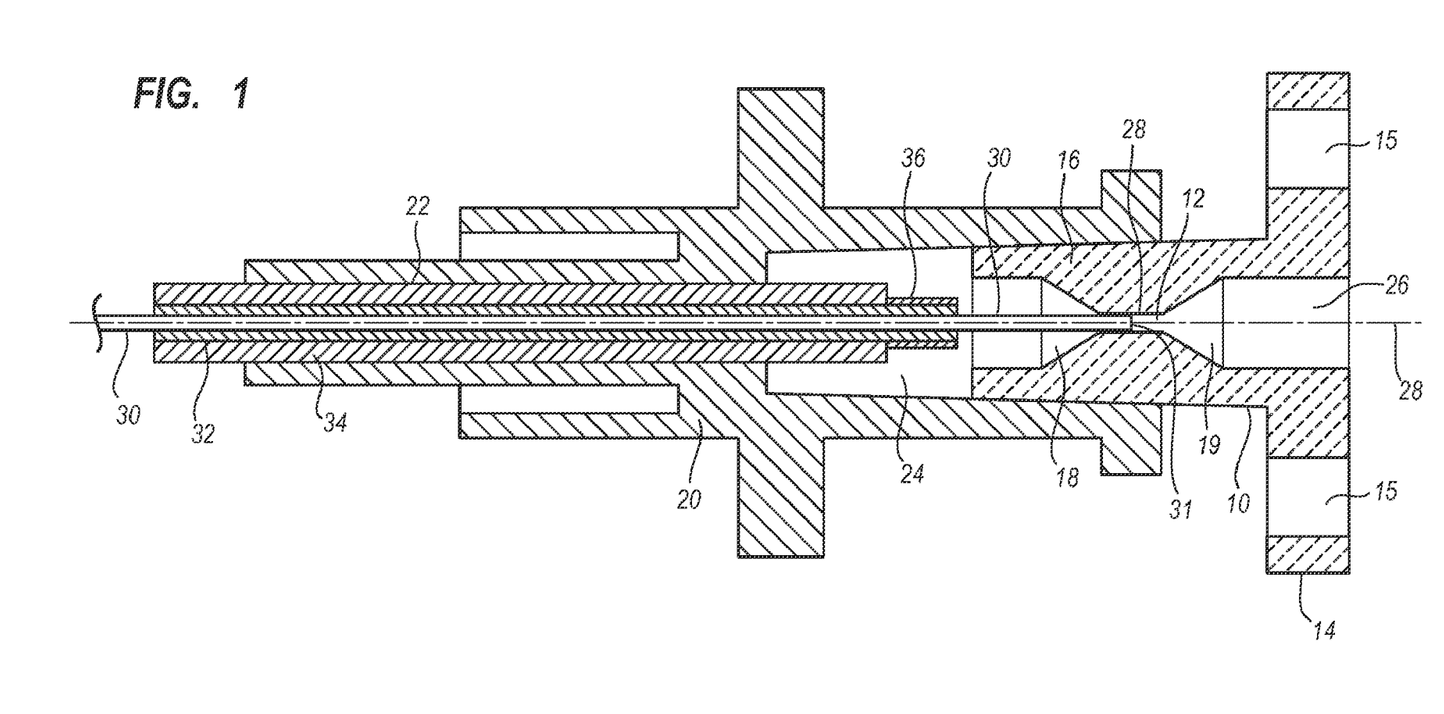
FIG. 1 shows a sectional view of a preferred embodiment of the coupling device.
Figure 2:
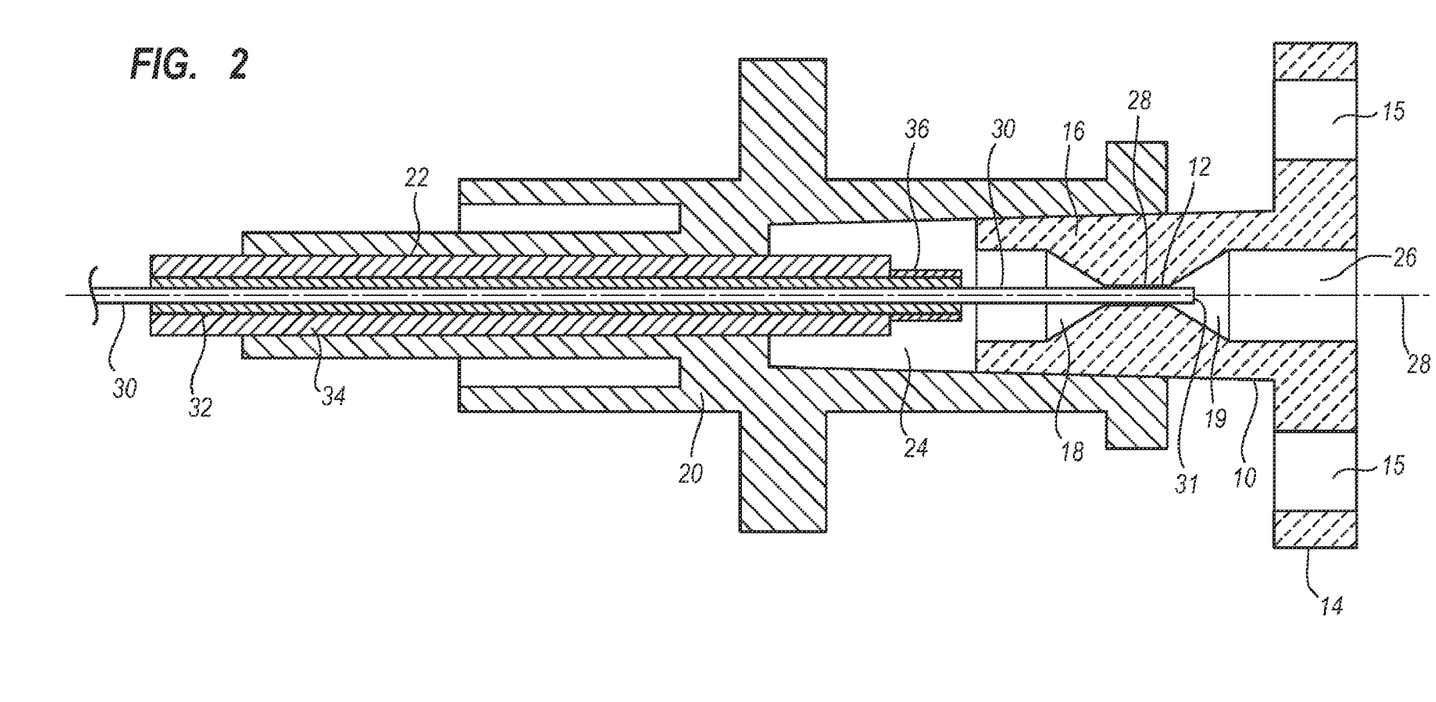
FIG. 2 shows a sectional view of a further preferred embodiment of the coupling device.

FIGS. 1 and 2 illustrate a preferred embodiment of the coupling device. The coupling device comprises a first coupling element 10 and a second coupling element 20. In this particular embodiment, the first coupling element is designed as a plug 10 and the second coupling element as a socket 20. The plug 10 and the socket 20 can be plugged together. In FIG. 1, the plug 10 and the socket 20 are in the state when plugged together.

Generally, in the case of the coupling device in accordance with the invention, the coupling elements 10 and 20 can be designed as molded parts that can be detachably joined, in particular plugged together or screwed together.

In the embodiment illustrated, the socket 20 is designed as a commercially available Luer push-on socket. Furthermore, the socket 20 is designed in one piece and as an injection-molded part. The plug 10 takes the form of a commercially available Luer push on plug.

The first coupling element 10 is produced in its entirety, or at least in the region of the first passage 12, from a ceramic material. The ceramic material comprises, in particular, an oxide ceramic, preferably aluminum oxide ($Al_2O_3$), with the aid of which the part can be produced with a smooth surface in a cost-effective fashion, in particular by shaping and baking without further reworking.

The plug 10 has a base part 14 that is designed in the manner of a flange. Located in the base part 14 are bores 15 that enable the base part 14 to be fastened to an apparatus or the like. Extending outward from the base part 14 is an elongated extension 16 that is of conical design. The angle of the cone at the extension 16 amounts in this particular embodiment to 1.5°.

The plug 10 has an elongated first passage 12 that penetrates the extension 16 and the base part 14. Here, the longitudinal axes of the extension 16 and of the first passage 12 are of coaxial design relative to one another. Moreover, the extension 16 and the first passage 12 are arranged concentrically relative to one another.

The first passage 12 comprises a funnel-shaped section 18 that is located in the extension 16 and tapers toward the base part 14 and is, in particular, of conical design.

The first passage 12 has a widened portion 26 in the region of the base part 14. The widened portion 26 is provided, in particular, for holding an optical component or a further light guide. The optical component can be both a light emitting and also a light-sensitive component as well as a light applying component, for example a handheld instrument for surgical or therapeutic operations, particularly on the eye.

The plug 10 is designed in one piece in the embodiment illustrated. In an alternative embodiment, the plug 10 can also be designed in a multiplicity of parts, at least the part that comprises the funnel-shaped section 18 being produced from the ceramic material. Moreover, it is also possible to coat only the inner surface with ceramic.

The socket 20 has a cutout 24 that is designed to complement the extension 16. The diameter of the cutout 24 tapers with increasing distance from the plug 10. The angle of the cone of the cutout 24 likewise amounts to 1.5°.

The socket 20 has a second passage 22 that has a common longitudinal central axis A in the state when joined with the first passage 12 of the plug 10. The passage 22 has a circular cross section.

Located in the passage is a first tube section 32 and a second tube section 34. The outside diameter of the second tube section 34 corresponds approximately to the inside diameter of the second passage 22. The outside diameter of the first tube section 32 corresponds approximately to the inside diameter of the second tube section 34. The second tube section 34 is arranged in the second passage 22. The second tube section 34 is slightly longer than the second passage 22. The first tube section 32 is arranged in the second tube section 34.

Located in the first tube section 32 is a section of an elongated light guide 30, preferably designed as a one piece optical fiber or glass fiber, having a free end 31. The first tube section 32 effects a stabilization of the light guide 30. Furthermore, with its free end 31, the end region of the light guide 30 projects from the first tube section 32. The inside diameter of the first tube section 32 and of the central section 28, as well, of the first passage 12 corresponds approximately to the outside diameter of the light guide 30.

In FIG. 1, the light guide 30 terminates with its free end 31 in a central region or section 28 of the first passage 12, preferably approximately in the middle. This embodiment in accordance with FIG. 1 is particularly suitable for connecting a further light guide that is inserted from the other side into the central section 28.

In FIG. 2, the light guide 30 is led through the entire central section 28 of the first passage 12, and the free end 31 of the light guide 30 projects into the widened portion 26.

The funnel-shaped section 18 has the effect that the end section of the light guide 30 having the free end 31 is reliably inserted into or centered in the central region of the first passage 12 when the first coupling element 10 is joined to the second coupling element 20. The ceramic material has a particularly smooth surface on the inside of the funnel-shaped section 18, and so the risk of damage to the light guide 30 when the first coupling element 10 is joined to the second coupling element 20 is slight.

A corresponding funnel-shaped section 19 that opens into the central section 28 at the side averted from the funnel-shaped section 18 can facilitate the insertion of the further light guide, particularly in accordance with FIG. 1.

FIG. 3 to FIG. 6 illustrate how and in what sequence the second coupling element 20, the first tube section 32, the second tube section 34 and the sleeve 36 are joined.

Figure 3:
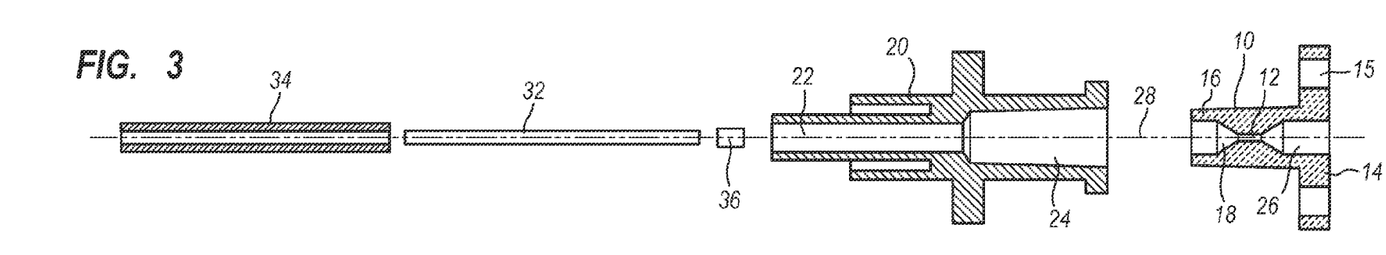
FIG. 3 shows an illustration of a first method step of the assembly of a coupling element.

In FIG. 3, the second tube section 34, the first tube section 32, the sleeve 36, the second coupling element 20 and the first coupling element 10 are illustrated as individual parts and aligned as in FIG. 1.

Figure 4:
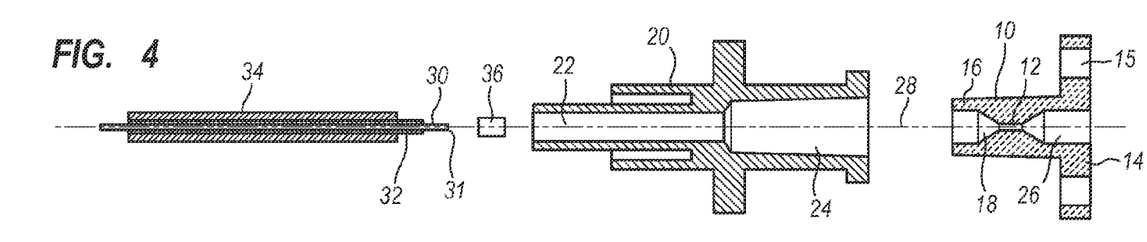
FIG. 4 shows an illustration of a second method step of the assembly of the coupling element.

In FIG. 4, the first tube section 32 is inserted into the second tube section 34, the first tube section 32 being flush with the second tube section 34 on the side averted from the first coupling element 10.

Figure 5:
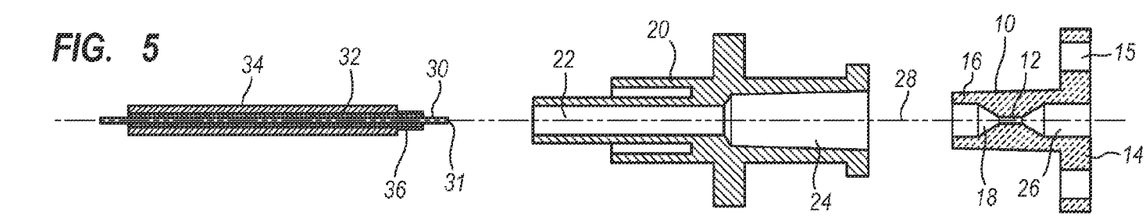
FIG. 5 shows an illustration of a third method step of the assembly of the coupling element.

In FIG. 5, the sleeve 36 is slipped over, the first tube section 32, the sleeve 36 being directly connected to the second tube section 34. The first tube section 32 and the second tube section 34 are mutually fixed by the sleeve 36.

Figure 6:
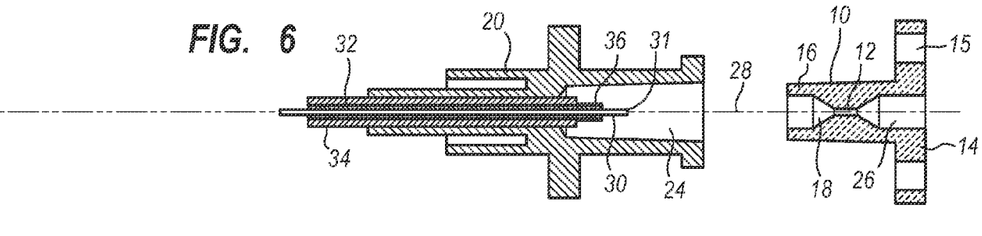
FIG. 6 shows an illustration of a fourth method step of the assembly of the coupling element.

In FIG. 6, the first tube section 32, the sleeve 36 and the second tube section 34, which are joined to form one part, are inserted into the second coupling element 20. Here, the end of the first tube section 32 that faces the first coupling element 10 is still located inside the cutout 24.

The tube sections 32 and 34 can also be omitted when the light guide 30 is fixed directly in the second passage 22, for example by means of adhesive, or in a force-closed fashion.

Figure 7:
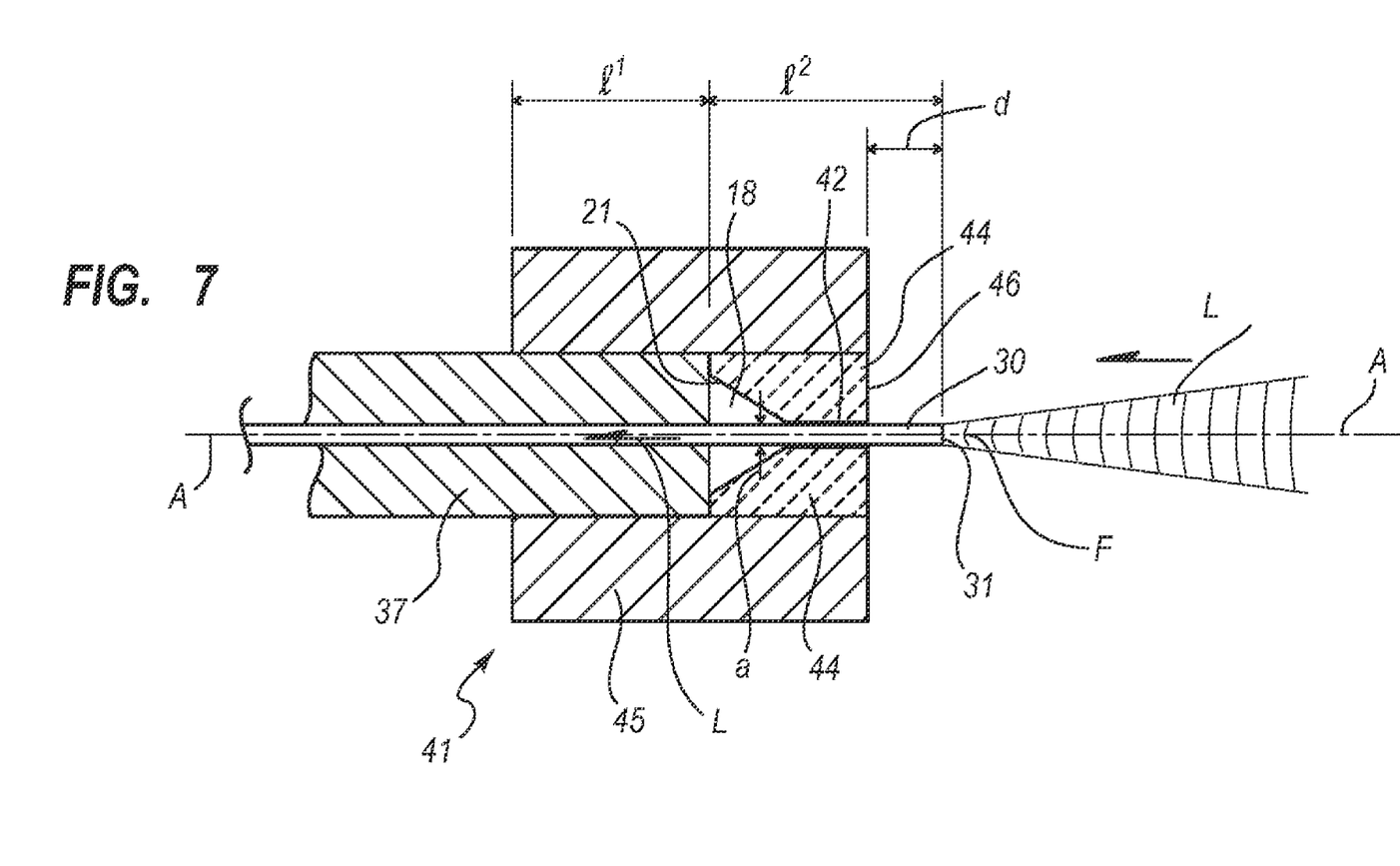
FIG. 7 shows a sectional view of another embodiment of a coupling device.

In the further embodiment according to FIG. 7 a coupling element 41 is shown having an outer sleeve-like element or outer part 45, and an inner part 44 comprised within or surrounded by the outer part 45 and fixed therein, in particular by gluing or pressing-in. The inner part 44 has a flat front surface 46 which is flush with a flat front surface 49 of the outer part 45 surrounding the inner front surface 46. The inner part 44 is made, in particular directly formed, of ceramic material and has a funnel-shaped section 18, but no straight section compared to FIG. 1 or 2. The inner part 44 has a funnel-shaped section 18 and a subsequent central passage 42.

The central passage 42 extends longitudinally along the central axis A and has a constant diameter which is only slightly larger than the outer diameter a of the optical fiber or light guide 30 so that the central passage 42 delimits and restricts movement of the light guide 30 in radial direction orthogonal to the central axis A but not in axial direction along the longitudinal axis A or, in other words, the light guide 30 is held within the central section 42 in the radial direction, but is freely moveable axially with regard to the central axis A.

The funnel-shaped section 18 decreases in diameter in the direction towards the entrance or opening of the central section 42, in particular linearly or in a conical shape and has an inner guiding surface 21 guiding the free end 31 of the light guide 30 during introduction or insertion of the light guide 30 into the central section 42. During this guiding process the free end 31 of the light guide 30 in most of the cases may come into contact with and slide along the surface 21 of the funnel-shaped section 18 of the inner element 48 towards the entrance or opening of the central section 42 and finally enters the central section 42. In other words, during axial or longitudinal pushing forward with a component parallel to central axis A towards the section 42 through the funnel-shaped section 18, the light guide 30 is guided along the surface 21 of the funnel-shaped section 18 into the central section 42 due to the fact that the funnel-shaped section 18 decreases in diameter towards the central section 42, thereby providing self-aligning of the light guide 30 along the optical central axis A even it was bent or not oriented along the axis before.

Now, in order to avoid that the light guide 30 is split or damaged at its free end 31 during the sliding on the guiding surface 21 in the guiding process the inner surface 21 of the inner part 44 in the funnel-shaped section 18 is formed of a ceramic material of the type described above providing a smooth surface or sufficiently low surface roughness as described previously. In the preferred embodiment shown in FIG. 7 the whole inner part 48 is made of a ceramic material. But in general it suffices that the inner part 44 is coated at the inside or consists only at its inner surface 21 of ceramic material.

The light guide 30 in FIG. 7 is free over a length 12 from its free end 31 and then starting after the length 12 from its free end 31 surrounded by a tube 37 which fits into the outer part 45 or, in other words, has about the same outer diameter as the inner diameter of the outer part 45, and is, at its front surface, in contact or butts against the annular end surface of the inner part 44 surrounding the entrance of the funnel-shaped section 18.

However, the outer part 45 does not adjust or align the light guide 30 because the free end 31 of the light guide 30 comes into contact with the guiding surface 21 of the inner part 44 before the tube 37 enters the outer part 45. This is due to the fact that the length 12 of the free section of the light guide 30 having the free end 31 and sticking out of or protruding from the tube 37 is larger than the length 11 of the portion of the tube 37 being inserted into the outer part 45 or, in other words the distance 11 of the annular end surface of the inner part 44 at the funnel-shaped section 18, i.e. 12>11. The tube 37 holding the light guide 30, therefore, forms a coupling element which is inserted into the coupling element 41 thereby forming a coupling device with the two coupling elements 37 (with light guide 30) and 41.

In a further embodiment not shown the inner part 44 can also have a straight section of constant diameter much larger than the outer diameter a of the light guide 30 adjacent and preceding the funnel-shaped section 18.

Figure 8:
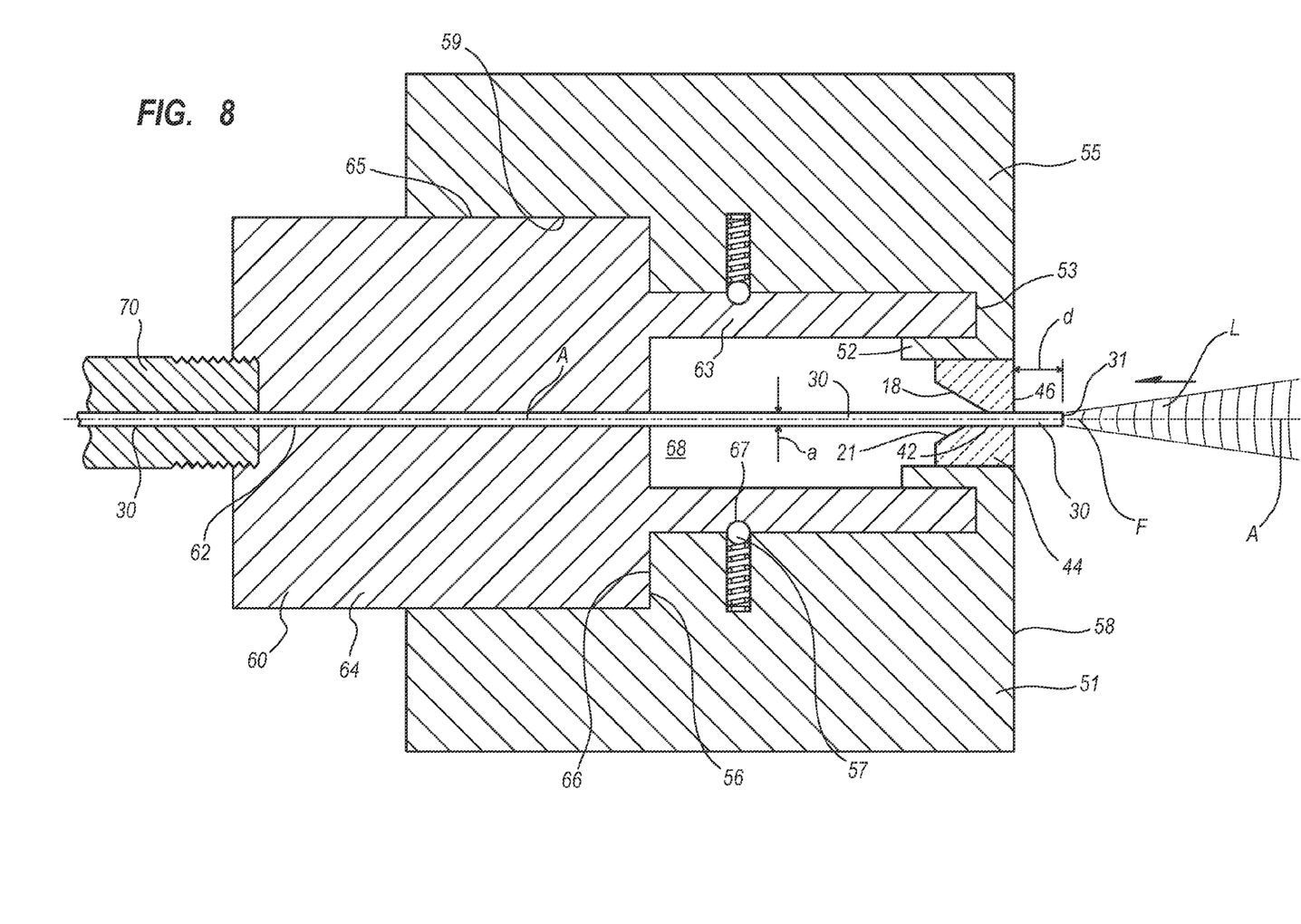
FIG. 8 shows a sectional view of yet another preferred embodiment of a coupling device.

FIG. 8 shows a further embodiment of an optical coupling device comprising a first coupling element 60 designed as a plug and a second coupling element 51 designed as a socket. The first coupling element 60 comprises a main body 64 which has a passage 62 (a first passage) in which the light guide 30 is held and fixed in particular glued or clamped. Furthermore the first coupling element 60 has a sleeve 63 formed at the body 64 and having a cylindrical shape around the central axis A and surrounding a hollow inner space 68. The second coupling element 51 comprises an outer part 55 and an inner part 44 which is formed like in the embodiment shown in FIG. 7 and fixed in particular glued or pressed in the outer part 55 within a section of the outer part 55 formed as an inner sleeve 52.

FIG. 8 shows the plugged in state of the coupling device. The sleeve 63 of the first coupling element 60 is plugged or inserted at its front end into an annular groove 53 in the outer part 55 of the second coupling element, which groove 53 surrounds the inner sleeve 52. The outer cylindrical surface of the inner sleeve 52 of the outer part 55 of the second coupling element 51 rests against the cylindrical inner surface of the sleeve 63 of the first coupling element 60. The main body 64 of the first coupling element 60 is stopped axially with a radially extending annular stop surface 66 against a corresponding stop surface 56 of the second coupling element 51 and, furthermore rests with a cylindrical outer surface 69 resting against an inner cylindrical surface 59 of the second coupling element 51 and thereby radially fixed.

The first coupling element 60 is axially locked by a ball catch 57 catching or locking or snapping into an annular groove at the outside of the sleeve 63 of the first coupling element 60 providing a certain minimum force for unplugging the coupling elements from one another.

In the plugged in state the light guide 30 is self-aligned in the passage 42 of the inner part 44 due to the previously described guiding process along or on the smooth ceramic surface 21 of the funnel-shaped section 18 and outside of the passage 42 extends freely without support along the central axis A within the inner space 68 of the sleeve 63 of the first coupling element 60.

Now, in FIGS. 7 and 8 the optical fiber or light guide 30 extends with its free end 31 beyond the front surface 46 or juts out or protrudes from the front surface 46 of the inner part 45 by a distance d which is usually larger than the diameter a of the light guide 30. This distance d of the free end 31 of the light guide 30 from the surrounding front surface 46 of the inner part 45 holding the light guide 30 in its passage or central section 42 is chosen preferably at least 1 mm and usually chosen between 1 mm and 5 mm, preferably between 1 mm and 3 mm. The outer diameter a of the optical fiber or light guide 30, for comparison, is usually in the range between 0.125 μm and 2 mm.

A reason for this protruding of the light guide 30 at its free end 31 is as follows: The laser light L to be fed into the light guide 30 at its free end 31 is focused in a focal region F which is adapted in its diameter approximately to the diameter a of the light guide 30 at the free end 31 in order to have as much intensity of the laser light L transferred into the light guide 30 as possible. The direction of propagation of the laser light L is indicated by the arrows in FIGS. 7 and 8 so that the laser light L comes in FIG. 7 and FIG. 8 from the right hand side and enters the light guide 30 at its free end 31 and then propagates to the left. The axis A forms an optical axis for this alignment or adjusting of the laser light L and the propagation of the laser light L in the light guide 30.

Now, whenever a new coupling element 37 or 60 according to FIG. 7 or FIG. 8 is used for the first time, the laser light L has to be focused so that its focal region F lies in the region of the free end 31 of the light guide 30, or in other words, the laser is focused right at the free end 31 of the light guide 30 so that the losses of the laser light intensity are at a minimum. Now, when adjusting and thereby moving the focal region F of the laser light L laterally and longitudinally in order to find the correct position at the free end 31 of the light guide 30 the laser light L would in the case that the free end 31 of light guide was within the section 28 as in the embodiment of FIG. 1 for instance, necessarily hit the front surface 46 around the opening of the passage 12 or its section 28. This would lead to a partial evaporation of the material which could deposit on the free end 31 of the light guide 30 and pollute it or deteriorate its transmission characteristics. The same problem can arise also in the adjusted situation if laser light (or: pulses) L of high intensity is used. The distance d of the free end 31 and consequently the focal region F of the laser light L from the surface 46 of at least 1 mm is however sufficient to prevent the laser light L damaging the surface 46.

Due to the fact that, in the embodiment of FIG. 7 or FIG. 8, the free end 31 of the light guide 30 now is further out at the distance d from the front surface 46 this problem during adjustment of the laser beam with respect to the free end 31 of the light guide 30 is highly reduced and the adjustment and focusing of the laser light is improved. The probability of the laser light L possibly hitting the front region 46 of the inner element 48 during adjustment is much less.

The described problem of evaporation of material during the adjustment process is also reduced by selecting ceramic material for the inner element 48 or inner part 45 also in the area around the front opening of the passage section 28 or 42 or at the whole front surface 46, in particular by making the whole inner element 48 or inner part 45 of the ceramic material.

The coupling device or coupling element according to the invention is suitable for applications in medical technology, in particular for endoscopic and surgical systems and appliances. The coupling device can be provided for equipment and systems that are used in an eye surgery. Such items of equipment are used, for example, in the cataract surgery for removing the old eye lens when artificial lenses are subsequently implanted. Such items of equipment are also used for cornea surgeries in order to correct ametropia.

The hygiene conditions are particularly important in the case of medical applications. For this reason, the coupling device or coupling element according to the invention is provided as a disposable article, for example. Alternatively, or in addition, the coupling device or coupling element according to the invention can be sterilized.

The light guide 30 is provided, in particular, for the transmission of visible light and infrared light, in particular coherent light, that is to say light of constant phase relationship. The light is preferably produced for the light guide 30 by a laser, for example a $CO_2$ laser or diode laser or a neodymium-YAG laser, in particular for producing laser light in the visible spectrum.

LIST OF REFERENCE SYMBOLS

10 First coupling element, plug
12 First passage
14 Base part
15 Bore
16 Extension
17 Straight section
18 Funnel-shaped section
19 Section
20 Second coupling element, socket
21 Guiding surface
22 Second passage
24 Cutout
26 Widened portion
28 Section
29 Front surface
30 Light guide
31 Free end
32 First tube section
33 End section
34 Second tube section
35 Intermediate section
36 Sleeve
37 Tube
40 Coupling element
41 Coupling element
42 Passage
44 Inner part
45 Outer part
46 Front surface
48 Inner part
49 front surface
51 Coupling element
52 inner sleeve
53 groove
55 outer part
56 stop surface
57 ball catch
58 front surface
59 inner surface
60 coupling element
62 passage
63 sleeve
64 body
66 stop surface
67 annular groove
68 inner space
69 outer surface
70 cable
A Longitudinal central axis
a diameter
d distance
F focal region
L laser light
l1, l2 length

I claim:
1. A coupling device for a light guide, comprising:
   a) a first coupling element with a first passage for holding a light guide, having an end section with a free end and an intermediate section, following the end section, and
   b) a second coupling element with a second passage for holding and/or fixing the intermediate section of the light guide;
wherein:
   c) the first coupling element and the second coupling element can be detachably joined or are detachably joined in a coupled state;
   d) in the coupled state, the first passage and the second passage form a common passage and/or have or surround a common longitudinal axis; and
   e) the first passage has a funnel-shaped section that, in the coupled state, faces the second passage and widens toward the second passage;
wherein:
   f) at least in the region of the funnel-shaped section, the first coupling element is formed or made from ceramic material at least on its inner surface; and
   g) the first coupling element comprises two or more prefabricated parts fastened on or to one another, one part comprising the funnel-shaped section of the first passage and being produced or formed from the ceramic material at least on the inner surface thereof and the materials for the remaining parts of the first coupling element are metal.

2. The coupling device as claimed in claim 1, wherein the first passage of the first coupling element has a second section that adjoins the funnel-shaped section and is arranged in the coupled state on the side of the funnel-shaped section that is averted from the second passage.

3. The coupling device as claimed in claim 2, wherein:
in the coupled state, the second section of the first passage holds the free end and a directly adjoining first part of the end section of the light guide and adjusts them in such a way that an optical axis of the light guide is substantially aligned at the free end thereof along a longitudinal axis of this second section;
the second section of the first passage has a substantially constant inside diameter, and, at least in the end section, the light guide has a substantially constant outside diameter, and wherein the inside diameter of the second section of the first passage is adapted to the outside diameter of the light guide; and/or
the first passage has a third section that expands in a funnel-shaped fashion away from the second section.

4. The coupling device as claimed in claim 1 for connecting the light guide to at least one further light guide and/or to at least one optical component, in particular a light emitting component or a light detecting component or a light applying instrument, wherein:
the further light guide and/or the optical component can be, or are or is connected to or in the first passage of the first coupling element;
the further light guide and/or the optical component can be, or is connected to or in the second section of the first passage on the side averted from the funnel-shaped section; and/or
in the connected state, the further light guide is held with its free end and an adjoining end section in the second section of the first passage and is adjusted in such a way that an optical axis of the light guide is substantially aligned at the free end thereof along a longitudinal axis of this second section, and the free ends of the two light guides lie opposite one another.

5. The coupling device as claimed in claim 1, having at least one third coupling element for holding the further light guide and/or the at least one optical component, wherein:
the third coupling element can be detachably joined or is detachably joined with the first coupling element in a coupled state;
the third coupling element has a third passage for holding and/or fixing an intermediate section following the end section of the further light guide; and
in the coupled state, the first passage of the first coupling element and the third passage of the third coupling element form a common passage and/or have or surround a common longitudinal axis.

6. The coupling device as claimed in claim 1, wherein the ceramic material comprises at least one oxide ceramic material.

7. The coupling device as claimed in claim 6, wherein:
the oxide ceramic material comprises at least one of the members of the set comprising aluminum oxide, titanium dioxide, chromium oxide, magnesium oxide, beryllium oxide, and zirconium dioxide; and/or
the oxide ceramic material has a fraction of aluminum oxide in a range from 60% to 97%, and a fraction of titanium dioxide in a range from 3% to 40%; and/or
the oxide ceramic material has a fraction of chromium oxide in a range from 40% to 60%, and a fraction of titanium dioxide in a range from 40% to 60%.

8. The coupling device as claimed in claim 1, wherein:
the part of the first coupling element that has the first passage or at least the funnel-shaped section of the first passage is formed from a molded part, resulting from primary forming, of the ceramic.

9. The coupling device as claimed in claim 1, wherein the remaining parts of the first coupling element are aluminum or an aluminum alloy or a steel.

10. A coupling device for a light guide, comprising:
a) a first coupling element with a first passage for holding a light guide, having an end section with a free end and an intermediate section, following the end section; and
b) a second coupling element with a second passage for holding and/or fixing the intermediate section of the light guide:
wherein:
c) the first coupling element and the second coupling element can be detachably joined or are detachably joined in a coupled state:
d) in the coupled state, the first passage and the second passage form a common passage and/or have or surround a common longitudinal axis; and
e) the first passage has a funnel-shaped section that, in the coupled state, faces the second passage and widens toward the second passage:
wherein:
f) at least in the region of the funnel-shaped section, the first coupling element is formed or made from ceramic material at least on its inner surface; and
g) the first coupling element or a part of the first coupling element that has the first passage or at least the funnel-shaped section of the first passage is formed from a basic body with a surface layer made from the ceramic material; wherein the basic body is formed from a metal.

11. The coupling device as claimed in claim 10, wherein the basic body is formed from aluminum or an aluminum alloy or a steel.

12. The coupling device as claimed in claim 10, wherein an intermediate layer, in particular for promoting adhesion, and/or a chromium-nickel layer is/are arranged between the basic body and surface layer made from ceramic material.

13. The coupling device as claimed in claim 10, wherein the surface layer made from ceramic material is sprayed onto the basic body or the intermediate layer, in particular by thermal spraying or plasma spraying.

14. A coupling device for a light guide, comprising:
a) a first coupling element with a first passage for holding or fixing the light guide, the light guide having an end section with a free end and an intermediate section, following the end section, wherein the end section with the free end and the intermediate section of the light guide each protrude from the first passage; and
b) a second coupling element with a second passage for holding the light guide in the intermediate section;
wherein:
c) the first coupling element and the second coupling element are detachably joined in a coupled state;
d) the second passage comprises a funnel-shaped section and a subsequent central section;
e) the central section extends along a central axis and has a diameter which is only slightly larger than the outer diameter of the light guide so that the central section delimits movement of the light guide when inserted in radial direction orthogonal to the central axis but not in axial direction along the central axis;

f) the funnel-shaped section of the second passage decreases in diameter in the direction towards the central passage, in particular linearly or in a conical shape, and has an inner guiding surface guiding the end section or the free end of the light guide towards the entrance of the central section during insertion movement of the light guide into the second passage with a component parallel to the central axis towards the central section during a joining movement of the two coupling elements into their coupled state;

g) at least in the region of the funnel-shaped section, the first coupling element is formed or made from ceramic material at least on its inner guiding surface; and h) in the coupled state of the two coupling elements, the first passage and the second passage form a common passage for the light guide and/or have or surround a common longitudinal axis, the intermediate section of the light guide is arranged within the central section of the second passage and the end section with the free end of the light guide protrudes from the central section of the second passage at the side facing away from the first passage of the first coupling element or from the funnel-shaped section by a minimum distance of at least 1 mm.

15. The coupling device as claimed in claim 14, wherein:
the first coupling element comprises an outer part and an inner part comprised within the outer part and fixed therein, in particular by gluing or pressing-in;
the inner part comprises the second passage with the funnel-shaped section and the central section and is made from ceramic material at least at the inner guiding surface of the funnel-shaped section, completely made from ceramic material including a front surface surrounding the opening of the central section facing away from the funnel-shaped section.

16. The coupling device of claim 15 wherein:
the first coupling element comprises a main body which has the first passage in which the light guide is fixed in particular glued or clamped and a sleeve formed at the main body and having a cylindrical shape around the central axis and surrounding a hollow inner space;
further the inner part is fixed within a section of the outer part formed as an inner sleeve; and
in the coupled state the sleeve of the first coupling element is plugged at its front end into an annular groove in the outer part of the second coupling element, which groove surrounds the inner sleeve and the outer surface of the inner sleeve of the outer part rests against the cylindrical inner surface of the sleeve of the first coupling element and the main body of the first coupling element is stopped axially with a radially extending annular stop surface against a corresponding stop surface of the second coupling element.

17. The coupling device as claimed in claim 15, wherein the inner part has a flat front surface which is flush with a flat front surface of the outer part surrounding the inner front surface.

18. The coupling device as claimed in claim 15, wherein the outer part is formed from a metal or a plastic material.

19. The coupling device as claimed in claim 18, wherein the outer part is formed from aluminum or an aluminum alloy or a steel.

20. The coupling device as claimed in claim 14, wherein in the coupled state the first coupling element is axially, with respect to the central axis, releasably locked to the second coupling element, in particular by a ball catch locking into an annular groove at the outside of the sleeve of the first coupling element.

21. The coupling device as claimed in claim 14, wherein laser light is focused in a focal region at the free end of the light guide, which focal region is adapted in its diameter to the diameter of the light guide at the free end, and fed into the light guide at its free end.

22. The coupling device as claimed in claim 14, wherein:
the inner guiding surface of the funnel-shaped section has a surface roughness of at most one-fiftieth ($1/50$) of the cross-sectional dimension or of the diameter of the light guide; and/or
a surface roughness of at most 3 µm or 2.5 µm or 2 µm or 1.5 µm or 1 µm or 0.5 µm, wherein the light guide diameter is in the range from 100 µm to 1000 µm.

23. The coupling device as claimed in claim 22, wherein the inner guiding surface of the funnel-shaped section has a surface roughness of at most one-hundredth ($1/100$) of the cross-sectional dimension or of the diameter of the light guide.

24. The coupling device as claimed in claim 14, wherein the free end of the light guide protrudes from the central section of the second passage at the side facing away from the first passage of the first coupling element or from the funnel-shaped section by a distance between 1 mm and 5 mm.

25. The coupling device as claimed in claim 14, wherein the free end of the light guide protrudes from the central section of the second passage at the side facing away from the first passage of the first coupling element or from the funnel-shaped section by a distance between 1 mm and 3 mm.

* * * * *